May 29, 1934. E. R. SMITH ET AL 1,961,089
SPEED COORDINATING MECHANISM FOR MACHINE TOOLS
Filed July 30, 1931   2 Sheets-Sheet 1
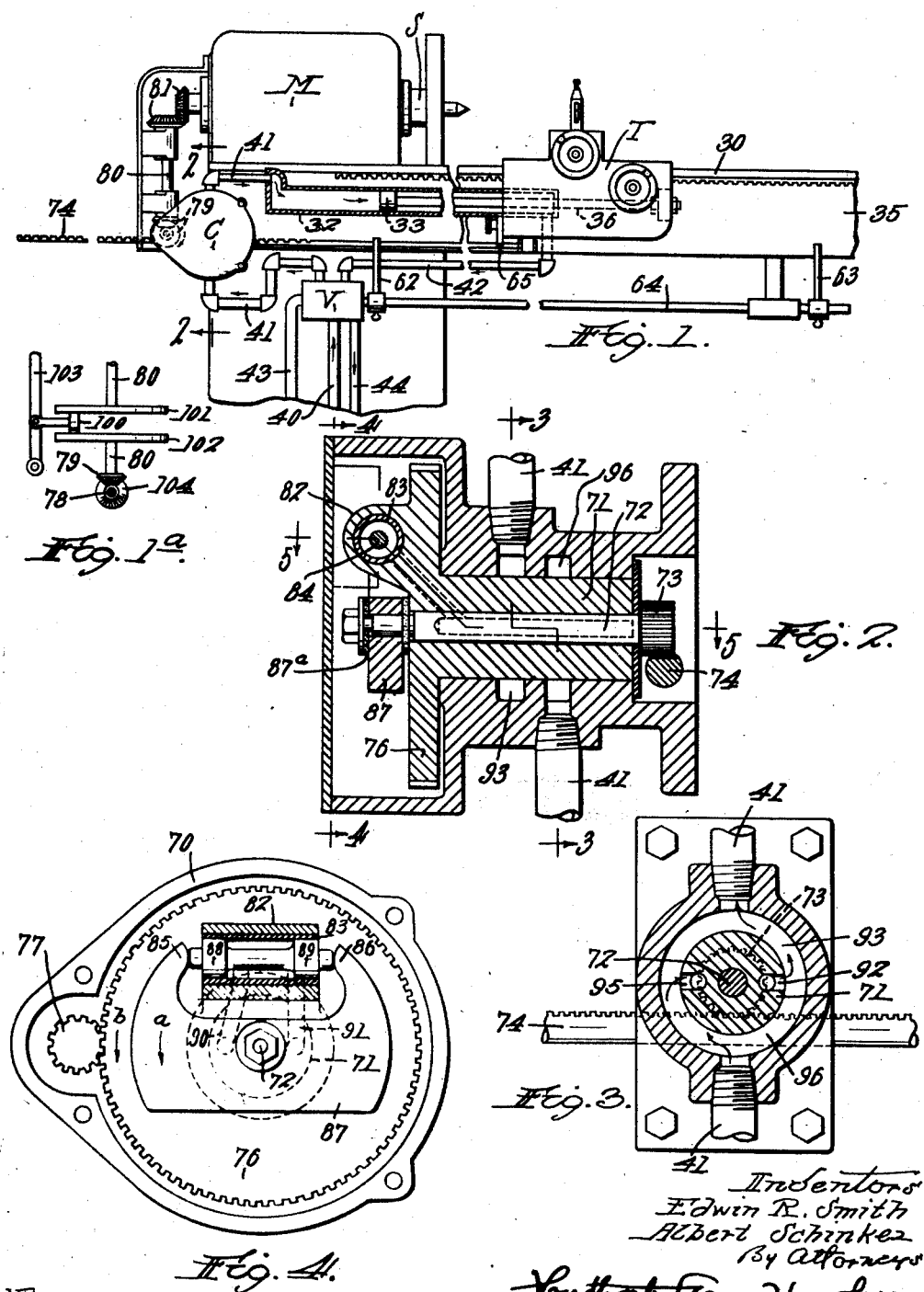

May 29, 1934.  E. R. SMITH ET AL  1,961,089
SPEED COORDINATING MECHANISM FOR MACHINE TOOLS
Filed July 30, 1931  2 Sheets-Sheet 2
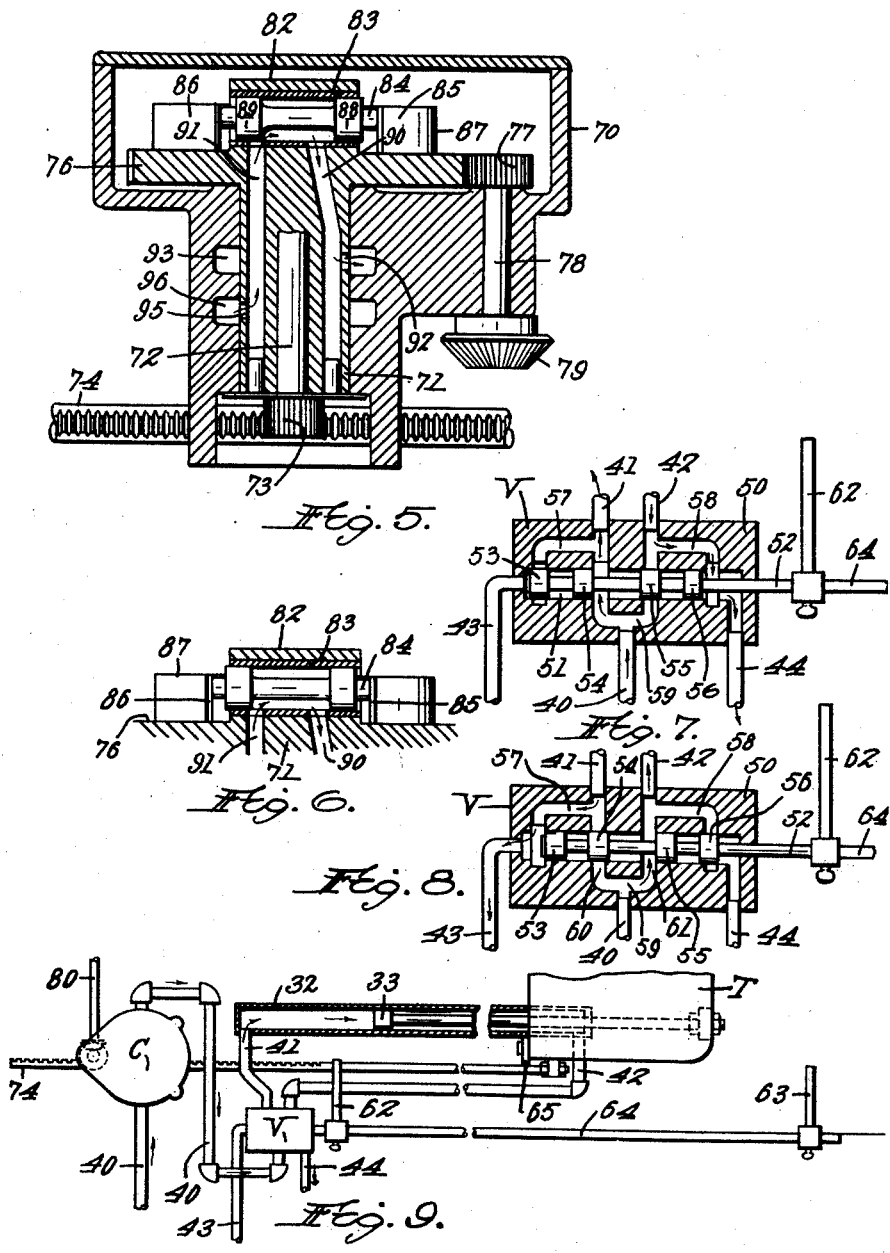

Patented May 29, 1934

1,961,089

UNITED STATES PATENT OFFICE 1,961,089

SPEED COORDINATING MECHANISM FOR MACHINE TOOLS

Edwin R. Smith and Albert Schinkez, Seneca Falls, N. Y., assignors to Seneca Falls Machine Company, Seneca Falls, N. Y., a corporation of Massachusetts Application July 30, 1931, Serial No. 554,049

9 Claims. (Cl. 82—2)

This invention relates to machine tools in which one member, such as a lathe tool carriage, is reciprocated by a cylinder and piston or other hydraulic mechanism, and in which another member, such as a work driving spindle, is given independent continuous rotary motion, as from an individual motor drive.

With such a combination of hydraulic reciprocation and independent rotation, it is found very difficult to maintain a close coordination between the speed of rotation of the spindle and the rate of longitudinal travel of the carriage. Such close coordination is at all times desirable and in some cases indispensable.

It is the general object of our invention to provide mechanism by which the speed of a hydraulically actuated member may be closely coordinated with the speed of an independently driven rotating member.

While this result may be attained by regulating the speed of either element in reference to the speed of the other as a standard, we have shown herein mechanism by which the rate of travel of the hydraulically actuated member is regulated with reference to the speed of rotation of the rotated member as a standard.

Our invention also contemplates a construction which permits the direction of travel of the reciprocated member to be reversed, while the rotating member continues to turn in a single direction. To effect this result, a part of the coordinating mechanism may be driven by friction connections which are arranged to slip and thus take care of reverse operation.

Another feature of the invention relates to a construction in which the rate of travel of the reciprocated member is automatically increased on the return stroke, preferably by the operation of the same mechanism which coordinates the speeds on the working stroke.

We also provide devices by which the coordinated speed relation may be changed as desired, so that more or less revolutions of the spindle will correspond to a unit of travel of the carriage or table.

Our invention further relates to arrangements and combinations of parts which will be hereinafter described and more particularly pointed out in the appended claims.

A preferred form of the invention is shown in the drawings, in which

Fig. 1 is a front elevation, partly in section, of portions of an engine lathe having our improvements embodied therein;

Fig. 1ª shows a detail modification, to be described;

Fig. 2 is an enlarged sectional view of certain valve mechanism, taken along the line 2—2 in Fig. 1;

Fig. 3 is a transverse sectional elevation, taken along the line 3—3 in Fig. 2;

Fig. 4 is a sectional front elevation, taken along the irregular line 4—4 in Fig. 2;

Fig. 5 is a sectional plan view, taken along the line 5—5 in Fig. 2;

Fig. 6 is a detail sectional plan view showing certain of the parts in Fig. 5 but in a different position;

Fig. 7 is a sectional elevation of a reversing valve mechanism;

Fig. 8 is a similar view but showing the piston valve in a different position; and Fig. 9 is a front elevation, partly in section, similar to Fig. 1, but showing a slightly modified construction.

Referring particularly to Fig. 1 we have shown our invention applied to an engine lathe to coordinate the revolutions of the work driving spindle S with the rate of longitudinal movement of the tool carriage T.

The work spindle S is continuously rotated at constant speed from a suitable source of power, such as a motor M, and the tool carriage T is moved back and forth along guide ways 30 on the machine bed or frame 35 by a hydraulic cylinder 32 and piston 33. One of these hydraulic members is secured to the frame 35 of the engine lathe and the other member is secured to the carriage T. As shown in the drawings, the cylinder 32 is fixed to the lathe frame or bed 35, and the piston 33 is connected by a piston rod 36 to the carriage T.

The hydraulic mechanism for controlling the table travel includes a supply pipe 40 through which oil is delivered under pressure from any suitable source, such as a pump not shown. This oil passes through a reversing valve mechanism V to pipes 41 and 42 which are connected to the opposite ends of the cylinder 32. Exhaust pipes 43 and 44 convey the oil discharged from the cylinder 32 to a storage tank or some equivalent structure.

A coordinating valve mechanism C is interposed in the pipe 41 leading to the left hand end of the cylinder 32, as viewed in Fig. 1.

The various parts above mentioned will first be described in detail as to structure, after which the operation of the device in coordinating the speed of the spindle S and tool carriage T will be fully explained.

Reversing valve mechanism

The reversing valve mechanism V is of an ordinary commercial form and comprises a valve block or casing 50 having a cylindrical opening 51 in which a piston rod 52 is slidable. The rod 52 is provided with spaced piston elements 53, 54, 55 and 56.

The block 50 is also provided with branch pipes 57 and 58 connecting the cylinder pipes 41 and 42 respectively to the opposite ends of the cylinder 51. A passage 59 is also provided, by which the supply pipe 40 is connected to spaced ports 60 and 61 in the cylinder 51.

Arms 62 and 63 (Fig. 1) are mounted on a bar 64 connected to the piston rod 52, and are positioned for engagement by an abutment 65 on the tool carriage T. The arms 62 and 63 may be adjusted longitudinally of the bar 64 to determine the desired limits of travel of the table T.

When the piston valve is in the left hand position indicated in Fig. 7, oil under pressure passes from the supply pipe 40 to the pipe 41 connecting to the left hand end of the cylinder 32, and the pipe 42 at the right hand end of the cylinder is connected through the passage 58 to the exhaust pipe 44. The tool carriage T is thus moved to the right on what may be termed its working stroke.

When the abutment 65 engages the right hand arm 63, the piston valve is moved to the position shown in Fig. 8, with the supply pipe 40 connected to the pipe 42 leading to the right hand end of the cylinder 32 and with the pipe 41 connected through the passage 57 to the exhaust pipe 43, thus moving the carriage T to the left on what may be termed the return stroke.

Coordinating mechanism

We will now describe the details of construction of the coordinating valve mechanism C shown in detail in Figs. 2 to 6.

Referring to the drawings, a casing member 70 is mounted in fixed position on the head end of the frame 35 and provides a bearing for an outer sleeve or valve member 71, within which an inner shaft 72 is rotatable.

The shaft 72, (Fig. 2) is provided with a pinion 73 engaged by a rack bar 74 secured at one end to the table T and longitudinally movable therewith. Consequently the inner shaft 72 rotates in fixed speed relation to the longitudinal movement of the table T.

The outer valve member 71 is provided with a disc or gear 76 (Fig. 2) at one end, having external teeth engaged by a pinion 77 (Fig. 4) mounted on a short shaft 78 (Fig. 5) rotatable in a fixed bearing in the casing 70 and connected by bevel gears 79, an upright shaft 80 (Fig. 1) and bevel gears 81 to the work spindle S. Consequently the outer valve member 71 is rotated in timed relation to the rotation of the spindle S.

A projection 82 (Fig. 2) is formed on the outer side of the disc 76 and is provided with a valve sleeve 83 (Fig. 5) fixed in said projection 82 and within which a piston valve 84 is slidably mounted. The ends of the valve 84 are engaged by arms 85 and 86 (Fig. 4) projecting upward from a plate 87, loosely mounted on the forward end of the inner shaft 72, (Fig. 2). A friction disc 87ª connects the plate 87 yieldingly to the shaft 72.

The piston valve 84 is provided with spaced piston elements 88 and 89 (Fig. 5) cooperating with oil passages 90 and 91 in the valve member 71. The passage 90 connects through a port 92 (Fig. 5) to an annular recess 93 in the casing 70, to which recess the upper portion of the pipe 41 is connected. Similarly, the passage 91 is connected through a port opening 95 to an annular recess 96, to which the lower portion of the pipe 41 is connected.

All oil flowing through the pipe 41 in either direction must pass through the passages 90 and 91, which are connected only through the valve sleeve 83, and which connection is controlled by the piston valve 84.

Operation

The operation of our speed coordinating mechanism is as follows:

As previously explained, the shaft 72 carrying the valve engaging member or plate 87 (Fig. 4) is rotated through the pinion 73 and rack 74 in timed relation to the longitudinal travel of the tool carriage T. At the same time, the valve member 71 is rotated in timed relation to the rotation of the spindle S and in the same direction when the carriage T is moving to the right on its working stroke, the respective movements being in the directions of the arrows a and b in Fig. 4.

If the parts 71 and 72 rotate at the same speed and in the same direction, the piston valve 84 will remain in its normal position in the valve sleeve 83, oil will flow through the pipe 41 at a predetermined rate. When in such normal position, the piston portion 89 of the valve 84 partially covers the end of the oil passage 91 in the valve member 71, as shown in Fig. 4.

If for any reason the table tends to move too slow or the spindle too fast, relatively to each other, the valve 84 will move to the left to the position shown in Fig. 6, allowing more oil to flow from the passage 91 to the passage 90 and thence to the cylinder 32. If, on the other hand, the spindle moves too slow or the carriage moves too fast, relative to each other, the valve will be moved toward the right to the position shown in Fig. 5 to further restrict the flow of oil to the cylinder 32.

The predetermined speed relation between the movement of the spindle and the movement of the tool carriage is thus maintained within very close limits. The control valve 84 is immediately adjusted to meet any change in load or any operating condition tending to disturb the predetermined ratio.

In Fig. 1ª we have indicated a change speed device which may be inserted between the ends of the shaft 80 (Fig. 1) so that the predetermined speed ratio may be varied as desired. A friction roll 100 is mounted between two friction discs 101 and 102 and is radially positioned by a manually adjustable handle 103. As this change speed mechanism causes the lower portion of the shaft 80 to revolve in a reverse direction, a bevel gear 104 on the shaft 78 is arranged to engage the bevel gear 79 on the shaft 80 on the opposite side from the construction shown in Fig. 1, so that the shaft 78 will not be reversed in direction of rotation.

When the table T moves to the left on its return stroke, the direction of rotation of the shaft 72 and plate 87 will be reversed, while the direction of rotation of the valve member 71 and gear 76 will remain unchanged.

The first effect of this reversal of movement is to move the piston valve 84 to the right in Fig. 4, or in a direction to entirely uncover the end of the passage 91, thus allowing free flow of oil through the oil passages 90 and 91. This speeds up the return movement of the carriage T. The plate 87 then slips relative to the shaft 72 during the balance of the return movement, such action being permitted by the friction connection 87ª. The return movement is further increased in speed by the fact that the effective cross sectional area of the cylinder at its right hand end is reduced by the area of the piston rod, which reduction in cross section contributes to further increased speed on the return stroke.

In the foregoing description, it is assumed that the tool carriage T moves to the right in Fig. 1 during the working stroke and to the left on its idle return stroke. By an obvious rearrangement of connections, the working stroke may be made to the left.

In Fig. 1 the coordinating mechanism C is interposed in the pipe 41 through which oil is supplied to the cylinder 32 during the working stroke. An optional arrangement is shown in Fig. 9, in which the mechanism C is placed in the supply pipe and controls the flow of oil before it enters the reversing valve mechanism V. In this latter construction the flow of oil through the mechanism C is always in the same direction, while in the form shown in Fig. 1 the direction of flow is reversed.

From the foregoing description, it will appear that we have provided effective and reliable mechanism by which the rate of movement of a member operated by hydraulic mechanism may be definitely related to the rate of movement of some other element, such as a work spindle, rotated by an electric motor or from some other independent source of power.

The provision of such mechanism is of great importance, as it permits hydraulic mechanism to be used for reciprocating motions, to which it is particularly adapted, while other actuating mechanism may be used for effecting rotary motions, for which purpose hydraulic actuation involves complications.

Having thus described our invention and the advantages thereof, we do not wish to be limited to the details herein disclosed, otherwise than as set forth in the claims, but what we claim is:—

1. In a machine tool having a reciprocated member and a rotated member, in combination, a hydraulic cylinder and piston for moving said first member, means to supply liquid under pressure to said cylinder, means to continuously rotate said second member, and a valve mechanism controlling the flow of liquid for said cylinder, said mechanism including two independently rotated parts, one part having a pinion and a rack bar engaged thereby and connected to said reciprocated member and movable therewith, and the other part being connected to rotate in timed relation to the speed of rotation of said rotated member.

2. The combination in a machine tool as set forth in claim 1, in which speed changing mechanism is provided in the connections to one of said rotated valve parts.

3. The combination in a machine tool as set forth in claim 1, in which speed changing mechanism is provided in the connections between said valve mechanism and said rotated member.

4. The combination in a machine tool as set forth in claim 1, in which speed changing mechanism is provided in the connections to one of said rotated valve parts, said speed changing mechanism being manually adjustable to determine a desired speed relation between said reciprocated and said rotated members.

5. In a machine tool having a reciprocated member and a rotated member, in combination, a hydraulic cylinder and piston for moving said first member, means to supply liquid under pressure to said cylinder, means to continuously rotate said second member, and a valve mechanism controlling the flow of liquid for said cylinder and including two independently rotated parts, one part having liquid passages controlled by a piston valve eccentrically mounted on and rotated with said part and tangentially movable relative thereto, and the other part having a portion engaging said piston valve and effective to move said valve in either direction upon the occurrence of a relative speed variation between said valve mechanism parts.

6. In a machine tool having a reciprocated member and a rotated member, in combination, a hydraulic cylinder and piston for moving said first member, means to supply liquid under pressure to said cylinder, means to continuously rotate said second member, and a valve mechanism controlling the flow of liquid for said cylinder and including two independently rotated parts, one part having liquid passages controlled by a piston valve eccentrically mounted on and rotated with said part, and the other part including a rotated plate having spaced arms engaging the opposite ends of said piston valve and effective to move said valve in either direction to open or close the valve on the occurrence of a relative speed variation between said reciprocated and said rotated members.

7. In a machine tool having a reciprocated member and a rotated member, one of said members being connected to move a piece of work and the other member being connected to move a tool relative to the work while said tool is operating on the work, in combination, hydraulic actuating mechanism for reciprocating said first member, means to continuously rotate said second member, and control valve mechanism effective to directly adjust the rate of liquid flow in said hydraulic actuating mechanism in such manner that a substantially constant speed ratio is maintained between said members, said hydraulic actuating mechanism including a cylinder and piston, one of which elements is connected to said reciprocated member, and said control valve mechanism including a valve device by which the flow of liquid to said cylinder is controlled, said device comprising a liquid-transmitting element rotated in fixed ratio to the movement of one of said members and having two separate liquid passages therein, a throttle valve controlling the flow between said passages, and an actuating device for said throttle valve rotatable in fixed relation to the movement of the other member.

8. In a machine tool having a reciprocated member and a rotated member, one of said members being connected to move a piece of work and the other member being connected to move a tool relative to the work while said tool is operating on the work, in combination, hydraulic actuating mechanism for reciprocating said first member, means to continuously rotate said second member, and control valve mechanism effective to directly adjust the rate of liquid flow in said hydraulic actuating mechanism in such manner that a substantially constant speed ratio is maintained between said members, said hydraulic actuating mechanism including a cylinder and piston, one of which elements is connected to said reciprocated member, and said control valve mechanism including a valve device by which the flow of liquid to said cylinder is controlled, said device comprising a liquid-transmitting element rotated in fixed ratio to the movement of one of said members and having two separate liquid passages therein, a throttle valve controlling the flow between said passages, an actuating device for said throttle valve rotatable in fixed relation to the movement of the other member and automatic means to open said throttle valve to effect a return stroke at increased speed.

9. In a machine tool having a reciprocated member and a rotated member, one of said members being connected to move a piece of work and the other member being connected to move a tool relative to the work while said tool is operating on the work, in combination, hydraulic actuating mechanism for reciprocating said first member, means to continuously rotate said second member, and control valve mechanism effective to directly adjust the rate of liquid flow in said hydraulic actuating mechanism in such manner that a substantially constant speed ratio is maintained between said members, said hydraulic actuating mechanism including a cylinder and piston, one of which elements is connected to said reciprocated member, and said control valve mechanism including an element rotated in accordance with the movement of the work, a second element rotated in accordance with the movement of the tool, and a valve which is given opening and closing movements in accordance with the differential rotation of said rotated elements.

EDWIN R. SMITH.
ALBERT SCHINKEZ.